United States Patent [19]

Duran et al.

[11] Patent Number: 5,037,259
[45] Date of Patent: Aug. 6, 1991

[54] NUT WITH SLEEVE LOCK

[75] Inventors: John A. Duran, Glendora; Gordon Bussard, Burbank; Peter Chang, North Hollywood, all of Calif.

[73] Assignee: Avibank Mfg., Inc., Burbank, Calif.

[21] Appl. No.: 427,242

[22] Filed: Oct. 25, 1989

[51] Int. Cl.[5] .................. F16B 37/02; F16B 37/04
[52] U.S. Cl. ................... 411/173; 411/177; 411/183; 411/361
[58] Field of Search ............ 411/108, 112, 113, 173, 411/177, 183, 277, 282, 303, 352, 353, 361, 181

[56] References Cited

U.S. PATENT DOCUMENTS

| | | | |
|---|---|---|---|
| 3,360,890 | 1/1968 | Dooley, Jr. | 411/277 |
| 3,425,259 | 2/1969 | Baugh | 411/361 |
| 3,443,617 | 5/1969 | Whiteside et al. | 411/181 |
| 3,640,327 | 2/1972 | Burt | 411/108 |
| 3,797,547 | 3/1974 | Shinjo | 411/303 |
| 4,475,859 | 10/1984 | Oliver | 411/361 |

Primary Examiner—Neill R. Wilson
Attorney, Agent, or Firm—Poms, Smith, Lande & Rose

[57] ABSTRACT

A nut having an enlarged head, one end disposed in a countersunk opening in one side of the panel, which head may be configured for anti-rotation, and either an integral threaded portion or internal floating threaded insert at the other end extending through the panel. A sleeve is locked to the body of the nut retaining the same to the underside of the panel and allowing for variation in panel thickness. The nut threadably engages a threaded member that may be mounted in a panel.

36 Claims, 4 Drawing Sheets

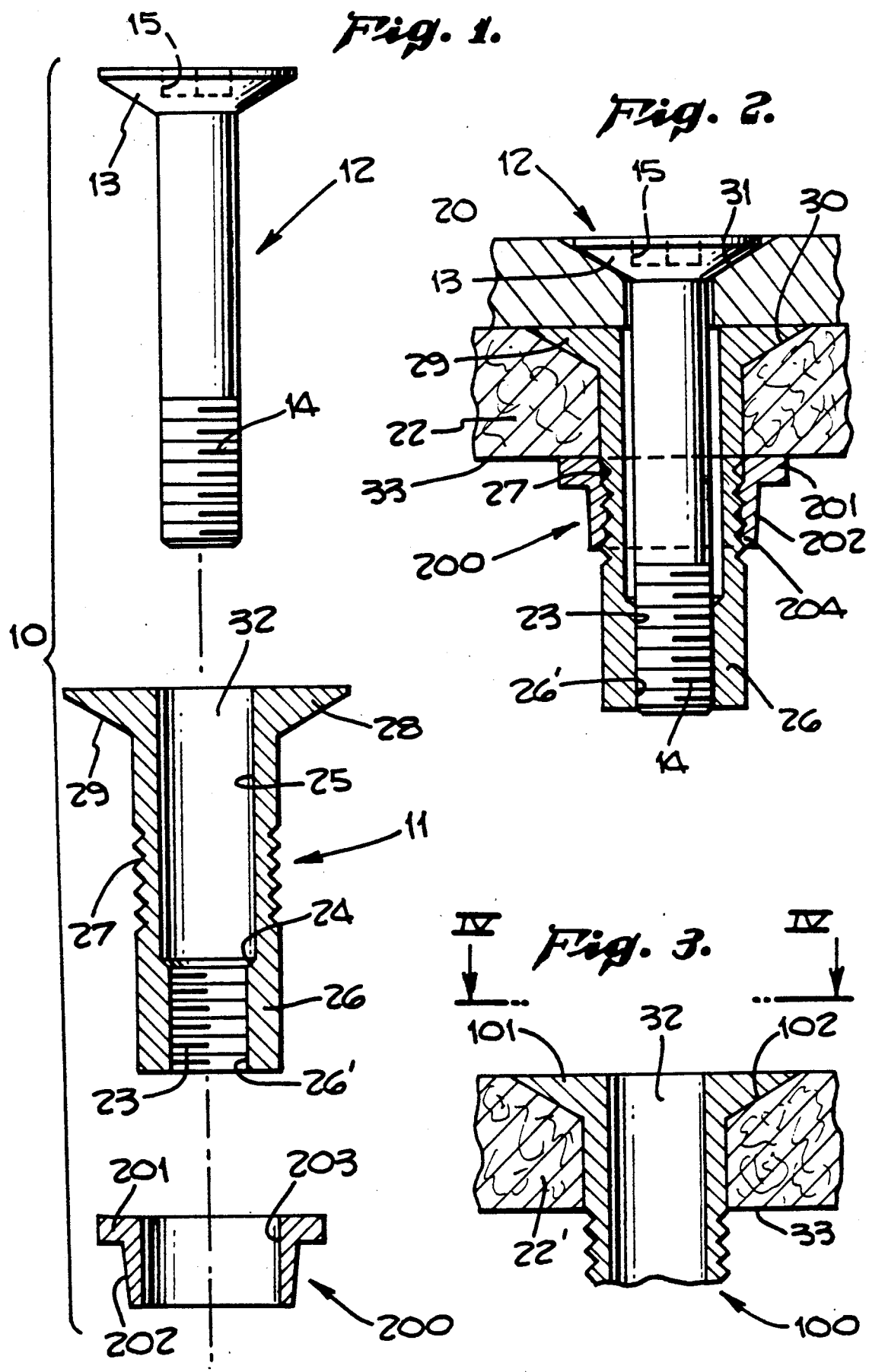

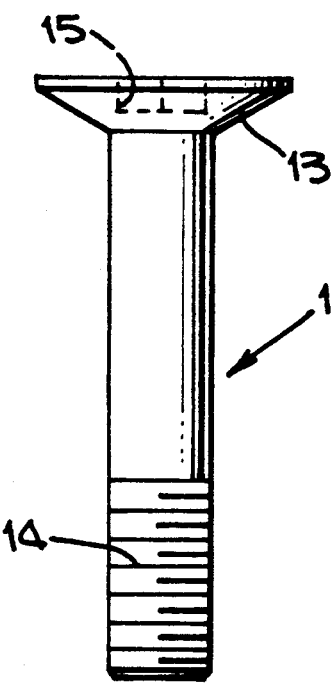
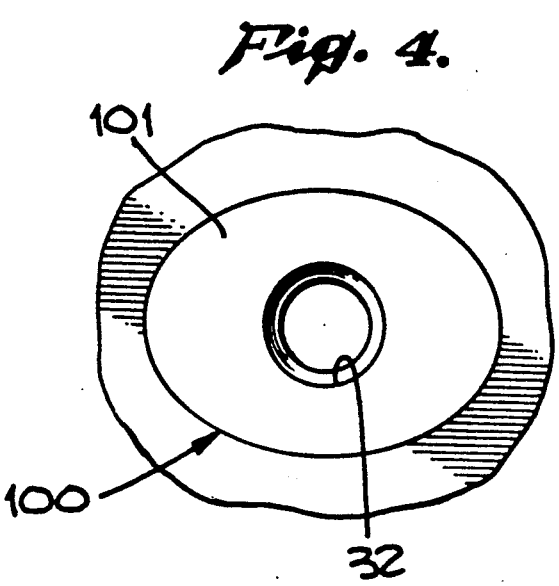
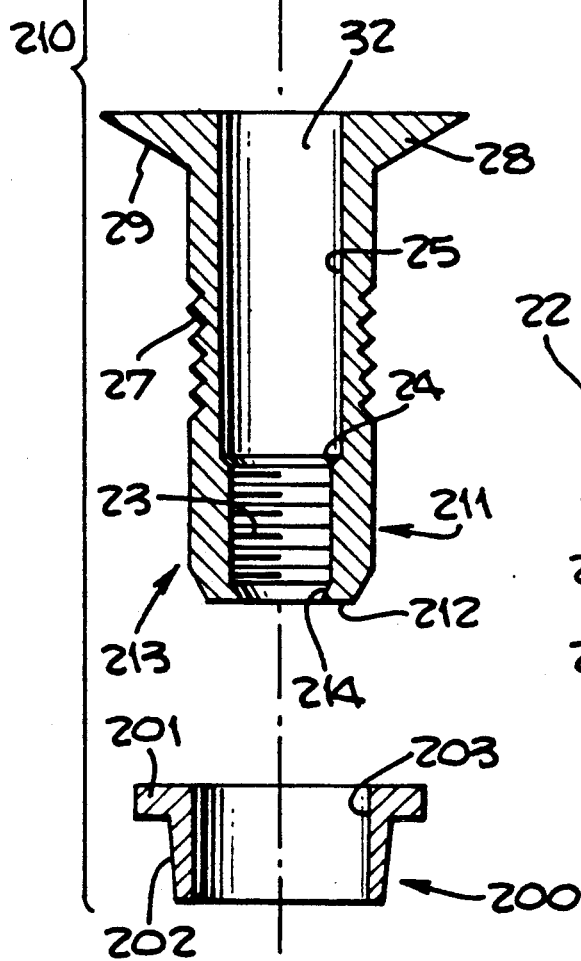
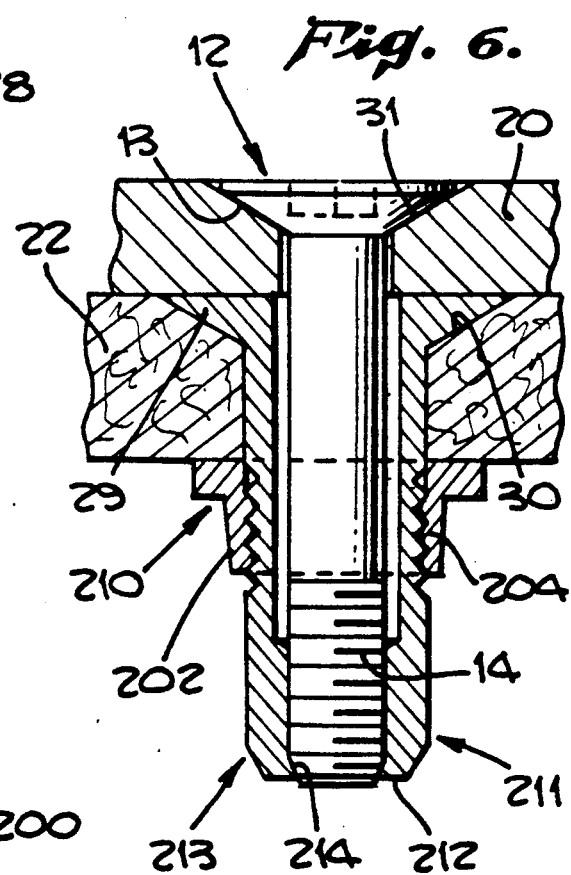

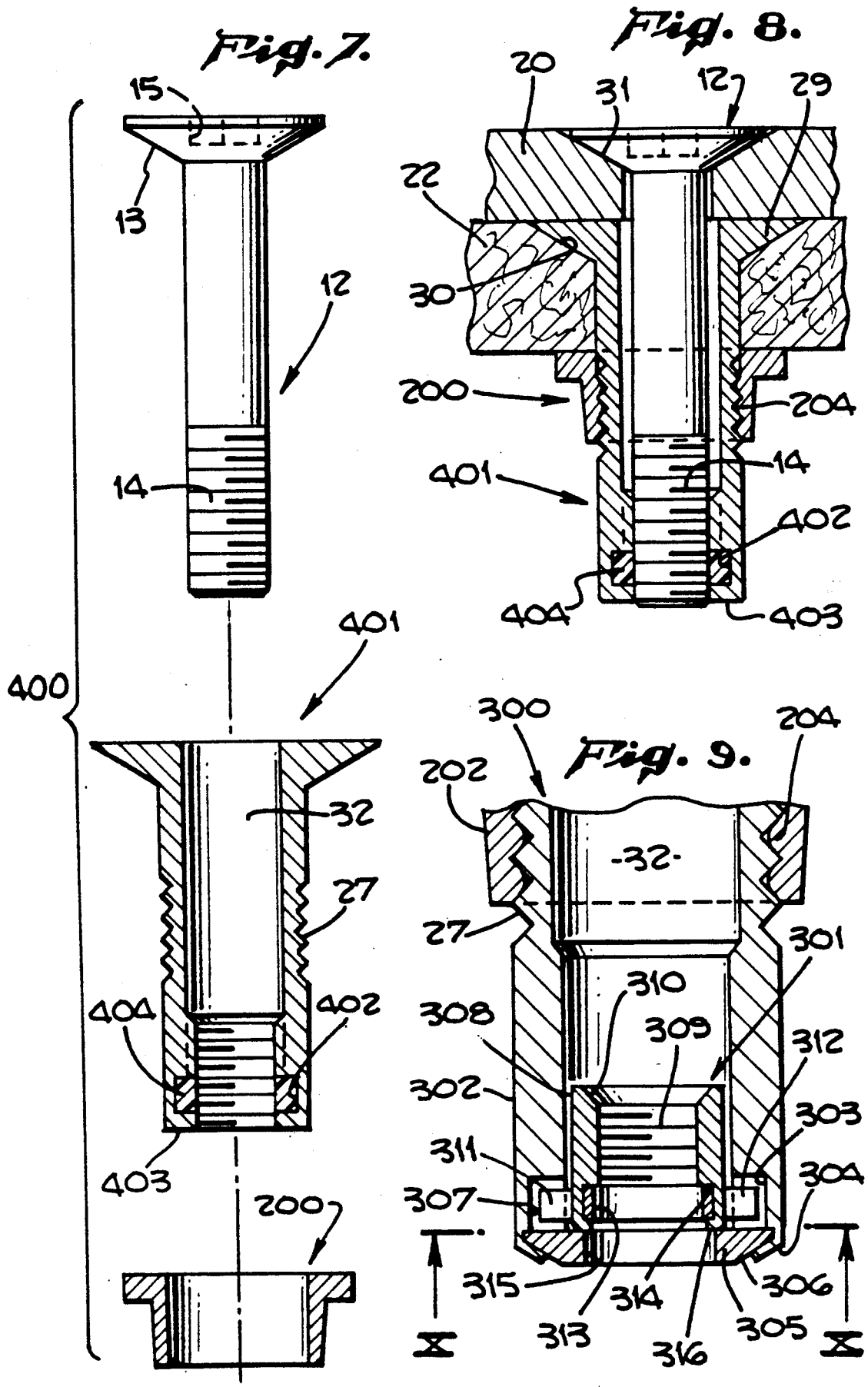

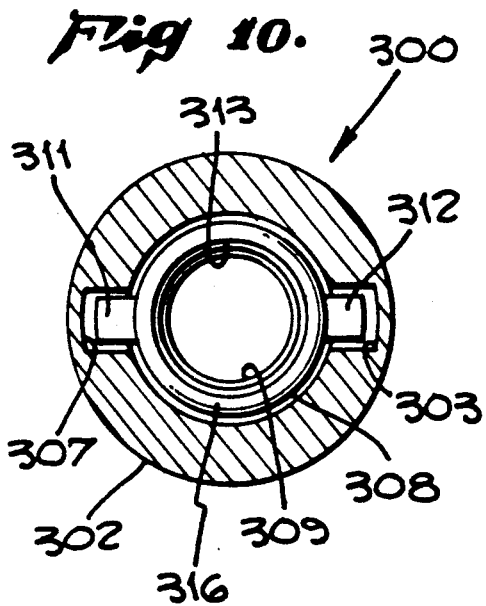
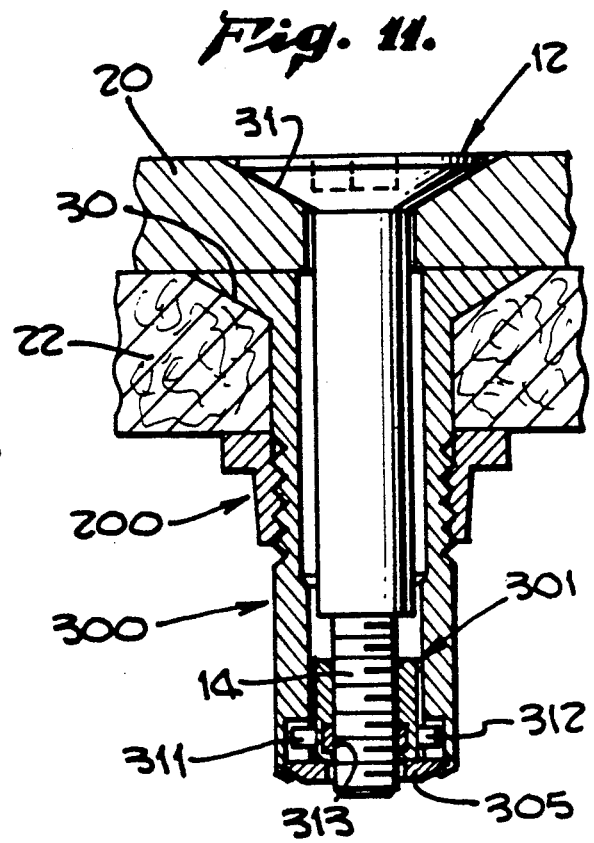
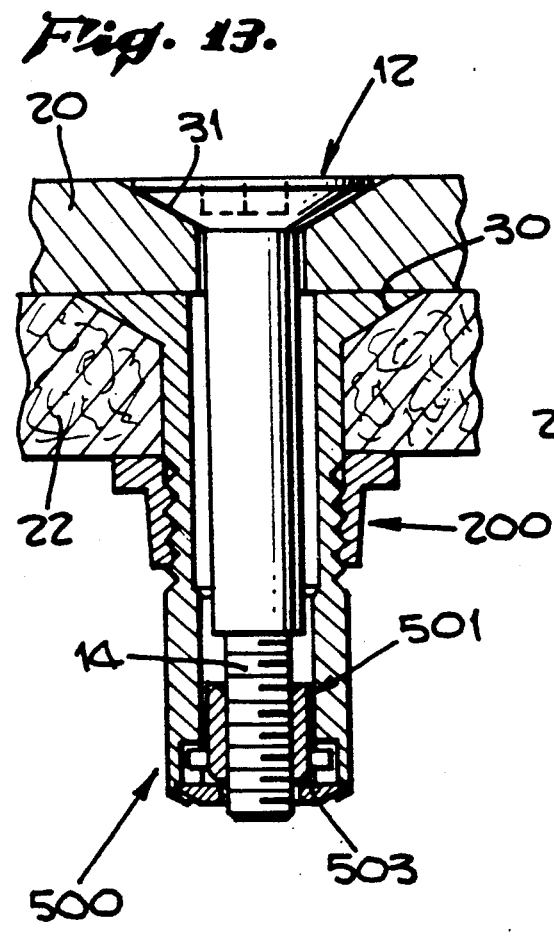
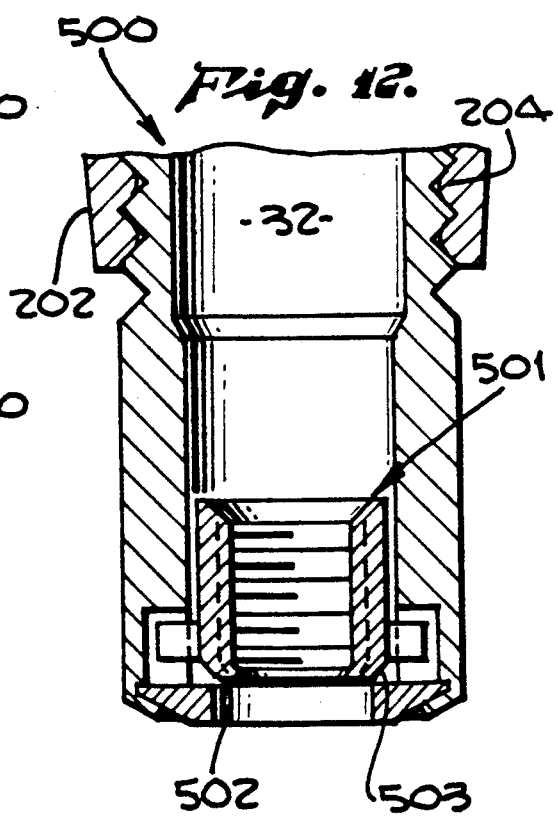

NUT WITH SLEEVE LOCK

BACKGROUND OF THE INVENTION

1. Field of the Invention

The invention relates to nuts; and, more particularly, to a nut having a sleeve lock adapted to retain the nut to a panel while allowing for variations in panel thickness.

2. Description of the Prior Art

Quick action fasteners are well known in the art. These fasteners are used in aircraft panels having holes of certain diameters. Such fasteners in the prior art, and most flush head-type bolts, have a countersunk opening in the head thereof configured to a tool, such as a hex opening for receiving therein an Allen-type tool, whereby the tool can be inserted into the opening and the bolt rotated to install or remove the same.

In normal aircraft installations, particularly those involving panels of composite materials, there is a preset hole diameter into which such fasteners are to be installed. The fastener assemblies to be installed in such panels include a nut having an enlarged head disposed in a countersunk surrounding the hole, the nut having an elongated shank extending through the hole to the other side of the panel. In order to fixedly secure such nuts to the panel for non-rotation, it is necessary that such nuts be somehow locked to the underside of the panel, as by swaging of the shank. Nuts that are installed by means of expansion or collapsing are not suitable for use in composite panels as the installation operation can cause cracking or fissures in the panel; thus, such swaging can cause cracks, particularly in panels of composite material, and it is difficult to compensate for panels of varying thicknesses using nuts of predetermined shank lengths.

There is thus a need for a fastener assembly wherein the assembly accommodates itself to panels of varying thicknesses into which the nut thereof is installed in a non-rotating manner and relieves stresses in such panels surrounding the hole in which the nut of the fastener assembly is installed.

SUMMARY OF THE INVENTION

It is an object of this invention to provide a fastener assembly which can be mounted to panels wherein the nut is locked to the panel in a manner relieving stresses on the panel.

It is a further objection of this invention to provide a fastener assembly including a nut which can accommodate itself via a sleeve lock to panels of varying thicknesses.

It is still another object of this invention wherein such fastener assembly as in the foregoing objects includes a nut secured to the panel in a non-rotating manner.

It is a further object of this invention to provide a fastener assembly as in the foregoing objects wherein the nut has a threaded insert for securement to a threaded bolt mounted in an abutting panel.

These and other objects are preferably accomplished by providing a fastener assembly having a nut with an enlarged head at one end disposed in a countersunk opening in one side of the panel, which head may be configured for anti-rotation, and either an integral threaded portion or internal floating threaded insert at the other end extending through the panel. A sleeve is locked to the body of the nut retaining the same to the underside of the panel and allowing for variation in panel thickness. The nut can be threaded to a member that may be mounted in an abutting panel and self-locking means may be provided between the nut and the member to which it is threaded.

BRIEF DESCRIPTION OF THE DRAWINGS

FIG. 1 is an exploded view of a fastener assembly in accordance with the invention;

FIG. 2 is an assembled vertical view of the fastener assembly of FIG. 1 and a mating bolt disposed in a panel;

FIG. 3 is a vertical view of a portion of a modification of a nut and panel in accordance with the invention;

FIG. 4 is a view taken along lines IV—IV of FIG. 3;

FIG. 5 is an exploded view, partly in section, of a modification of a nut and bolt assembly in accordance with the invention;

FIG. 6 is a vertical assembled sectional view of the assembly of FIG. 5;

FIG. 7 is an exploded view, partly in section, of another modification of a nut and bolt assembly in accordance with the invention;

FIG. 8 is an assembled sectional view of the assembly of FIG. 7;

FIG. 9 is a vertical view, similar to FIG. 2, of a modification of a nut in accordance with the invention;

FIG. 10 is a view taken along lines X—X of FIG. 9;

FIG. 11 is an assembled view, similar to FIG. 2, of the nut of FIG. 9 and the bolt and panel of FIG. 2;

FIG. 12 is a vertical view, similar to FIG. 2, of another modification of a nut in accordance with the invention; and FIG. 13 is an assembled view similar to FIG. 11 of the nut of FIG. 12.

DESCRIPTION OF THE PREFERRED EMBODIMENT

Referring now to FIG. 1 of the drawing, there is shown a fastener assembly 10 comprising a nut 11 adapted to mate with a bolt 12. Bolt 12 has an enlarged head 13 and an externally threaded shank 14.

Nut 11 includes a cylindrical shank portion 26 and an enlarged head 28 at the upper end of shank portion 26 which head 28 is tapered at tapered portion 29 on its undersurface leading to shank portion 26. Head 28 is adapted to abut or bear against a countersunk opening 30 (FIG. 2) in panel 22 when threaded to bolt 12 as will be discussed. Countersunk opening 30 in panel 22 is aligned with a countersunk opening 31 through abutting panel 20 as shown in FIG. 2. A hex head socket 15 may be provided in head 13 of bolt 12.

Nut 11 has a first upper generally circular internal throughbore 25 coaxially aligned with a lower generally circular internal throughbore 26' of an internal diameter less than the internal diameter of throughbore 26 forming a shoulder 24 at the intersection of throughbores 25, 26'. Nut 11 is internally threaded, as at threads 23, along throughbore 26'.

As particularly contemplated in the present invention, a plurality of spaced annular grooves or serrations 27 are provided on the exterior of nut 11 on the outside of the portion of nut 11 surrounding upper throughbore 25.

Also as particularly contemplated in the present invention, a locking sleeve 200 (FIG. 1) is provided having an annular generally flat washer portion 201 with a downwardly extending annular skirt 202. A throughbore 203 extends through sleeve 200 and, as seen in FIG. 1, skirt 202 is tapered downwardly from washer portion 201 as shown.

The assembly of the elements of FIG. 1 will now be described. After formation of openings 30 and 31 through panel 22 and panel 20, respectively, FIG. 2, the bolt 12 is disposed in opening 31 in panel 20.

Nut 11 is inserted through countersunk opening 30 and into the locking sleeve 200. The sleeve 200 is wedged up over the exterior of nut 11 and onto and over the serrations 27 until the washer portion 201 of sleeve 200 abuts against the underside 33 of panel 22 with skirt portion 202 conforming to serrations 27 as seen in the distorted area 204 in FIG. 2. Thus, nut 11 is trapped in opening 30 in panel 22.

Panel 20 may now be brought into position adjacent panel 22 with the threaded shaft 14 of bolt 12 threaded to threaded portion 23 of nut 11 as seen in FIG. 2.

The nut 11 may be provided with an anti-rotation configuration to prevent rotation of bolt 11 about its longitudinal axis when mounted in opening 30. Thus, as seen in FIGS. 3 and 4 wherein like numerals refer to like parts of the assembly of FIGS. 1 to 3, nut 100 (FIG. 3), otherwise identical to nut 11 of FIG. 1, may have an enlarged head 101 (FIG. 5) of elliptical configuration, with a like configured countersunk opening 102 in panel 22'. Thus, nut 100 cannot rotate about its longitudinal axis. Further, any suitable non-circular head may be used for nuts 11 and 100. That is, the bolt heads may be square shaped or any other irregular configuration disposed in a like configured hole for preventing rotation.

The assembly 10 may also have self-locking means for locking nut 11 to bolt 12. Thus, as seen in FIGS. 5 and 6 wherein like numerals refer to like parts of the embodiment of FIGS. 1 and 2, fastener assembly 210 comprises nut 211 otherwise identical to nut 11 having a deformed nose 212 providing an outer tapered section 213 and an inwardly extending tapered portion 214. When bolt 12 is threaded to nut 211, the deformed end 212 serves to lock nut 211 to bolt 12 to prevent rotation thereof as seen in FIG. 6.

Still another embodiment of the invention is shown in FIGS. 7 and 8 where again like numerals refer to like parts of the embodiment of FIGS. 1 and 2. Another locking means is provided by assembly 400 wherein nut 401, otherwise identical to nut 11, has an inner circular chamber 402 adjacent nose 403. A plastic annular ring or insert 404 is mounted within chamber 402. As seen in FIG. 8, when nut 401 and bolt 12 are installed in panels 20 and 22 as heretofore discussed with respect to the embodiments of FIGS. 1 and 2, insert 404 engages the threaded shank 14 and serves to lock bolt 12 to nut 401 as heretofore discussed with respect to the embodiments of FIGS. 1 and 2. Insert 404 can be of any suitable material, such as a resilient material, for example a polyimide resin may be used. It can be seen that there is disclosed a self-locking feature that can be added to the nut and bolt of FIGS. 1 and 2 by crimping or deforming the nose portion of the nut or use of an insert of a plastic material. In my U.S. Pat. No. 4,747,738, Col. 6, in lines 2 to 8 and 51 to 58, I described the use of a plastic insert, such as one of polyimide resin, to provide a friction lock along with deformation of the barrel 55 to accomplish the same.

Although an integral threaded portion 23 is shown on nut 11 in FIG. 1, as seen in FIGS. 9-11, wherein like numerals refer to like parts of the assembly of FIGS. 1 to 3, nut 300, otherwise identical to nut 11, may have an internal floating threaded nut 301 on the interior thereof, replacing threaded portion 23 of nut 11. Thus, the lower end 302 of nut 300 may have a pair of spaced interior slots 303, 307 (FIG. 10) with a thin-walled normally downwardly extending annular skirt 304 which is swaged or deformed inwardly trapping annular washer 305 therein. Washer 305 has an outer tapered surface 306 against which skirt 304 is swaged. Nut 301 has a main cylindrical portion 308 threaded on the interior 309 having a tapered portion 310 leading into the interior 309. A pair of ears 311, 312 are provided at the bottom of main portion 308 extending into and receivable in slots 307, 303, respectively, in a loose fit. It is also noted that the thickness of ears 311, 312 is less than the height of slots 303, 307 to provide further for such loose fit. An insert 313 is disposed within an annular undercut area 314 on the interior of nut 301 and retained therein by a thin walled swaged portion 316 of nut 301. As seen in FIG. 9, a throughbore extends all the way through nut 301 and is aligned with the opening 315 in washer 305 so that the threaded shaft 14 of bolt 12 of FIGS. 1 and 2 is threadably receivable within nut 301 and threaded to threaded portion 309 as seen in FIG. 11. Insert 313 is of a suitable plastic material, such as a polyimide resin as heretofore discussed.

The play between nut 301 and the remainder of nut 300 compensates for misalignment of the panels and openings therethrough. Also, nut 300 may be provided with an elliptical head and mating countersunk opening as discussed hereinabove with respect to FIGS. 3 and 4 (or any other non-circular configuration to provide for anti-rotation of the nut 300).

Another means for self-locking member 12 to a floating nut as in the embodiment shown in FIGS. 9-11 as illustrated in FIG. 12 and 13 wherein like numerals refer to like parts of the embodiment of FIGS. 9-11. Thus, nut 500 has an internal floating nut 501 on the interior thereof, the lower end of nut 500 being identical to end 302 of the nut of FIGS. 9-11. However, here floating nut 501 does not have an insert 313. Instead, the lower end 502 of internal threaded portion 309 is deformed inwardly at deformed portion 503 as shown to provide a self-locking with the mated threaded shaft 14 of member 12 as heretofore discussed and as seen in FIG. 13.

Thus, there is discussed a nut having a sleeve lock which is forced onto the serrations or grooves on the nut locking the same to a panel. The nut can then be threaded to a threaded bolt disposed in a panel and may be provided with an internal floating nut portion to allow for misalignment. The washer may be made of 304 stainless steel which is a relatively soft material compatible with the material of the panel 22 (which may be of composite material). The nut 11 may be of A286 stainless steel which is a harder material than 304 stainless steel. The serrations 27 can be disposed anywhere along the outside of the nut shank and thus allow for variations in thicknesses of the panel, particularly composite panels. Self-locking means may be provided by deforming the nut or by providing a floating nut internally mounted therein, or by means of a plastic insert. The nut may be supplied to the end user with or without such self-locking feature.

I claim:

1. A fastener assembly for securing a nut in an opening in a panel comprising:
   a bolt having an enlarged head at one end and a threaded shank portion;
   a nut having an enlarged head at one end disposed in said opening on one side of said panel, said nut having a shank portion extending through said opening to the other side of said panel, said nut having a threaded portion on said shank portion, said threaded shank portion of said bolt being threaded to said threaded portion of said nut, said nut having locking means disposed about the outer surface of said shank portion on the other side of said panel; and deformable locking means adapted to mate with said first mentioned locking means surrounding said shank portion on the other side of said panel; and deformable locking means adapted to mate with said first mentioned locking means surrounding said shank portion and engaging said first mentioned locking means in a locking relationship retaining said nut firmly within said opening, said deformable locking means comprising a generally flat apertured preformed washer portion having a flat non-deformable annular head disposed against the underside of said panel with an integral deformable skirt portion wedged onto said first mentioned locking means, the overall diameter of said washer portion being slightly greater than the overall diameter of said enlarged head of said bolt.

2. In the assembly of claim 1 wherein said first mentioned locking means includes a plurality of spaced annular serrations about the exterior of said shank portion.

3. In the assembly of claim 1 wherein a countersunk hole leads into said opening and the enlarged head of said bolt conforms to said hole.

4. In the assembly of claim 1 wherein the skirt portion of said washer is made of a softer material than said shank portion.

5. In the assembly of claim 4 wherein said skirt portion of said washer is made of a material compatible with the material of said panel.

6. In the assembly of claim 5 wherein said panel is of a composite material.

7. In the assembly of claim 4 wherein said skirt portion is made of 304 stainless steel and said shank portion is made of A286 stainless steel.

8. In the assembly of claim 1 including non-rotating means associated with both said opening and said enlarged head of said nut for preventing rotation of said nut about its longitudinal axis.

9. In the assembly of claim 8 wherein said non-rotating means includes an irregularly shaped countersunk hole leading into said opening, said enlarged head being configured similarly to said hole.

10. In the assembly of claim 9 wherein said hole and said head are elliptically shaped.

11. In the assembly of claim 1 wherein the threaded portion of said nut includes threads on the interior of said shank portion.

12. In the assembly of claim including a mating threaded member threaded into said threaded nut portion wherein the shank portion of said nut terminates in a nose portion deformed inwardly toward the central longitudinal axis of said shank portion, said deformed nose portion engaging said mating threaded member to lock said nut to said threaded member.

13. In the assembly of claim including a mating threaded member threaded into said threaded nut portion wherein the shank portion of said nut has a resilient insert therein engaging said threaded member to lock said nut to said threaded member.

14. In the assembly of claim 1 wherein the threaded portion of said nut includes said shank portion having a main body portion and a floating nut loosely disposed in said main body portion having threads on the interior thereof.

15. In the assembly of claim 14 including floating nut anti-rotating means associated with said floating nut and said main body portion.

16. In the assembly of claim 15 wherein said floating nut anti-rotating means includes said main body portion terminating in a nose having an apertured annular ring therein, the terminal end of said main body portion being thin-walled and swaged against said ring retaining said ring at the nose of said shank portion, a pair of spaced slots on diametrically opposite sides of said main body portion on the interior thereof between said ring and said enlarged head, said nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

17. In the assembly of claim 16 including a mating threaded member threaded into said threaded throughbore of said floating nut wherein a resilient insert is mounted in said throughbore engaging said mating threaded member locking the same to said floating nut.

18. In the assembly of claim 17 including a mating threaded member threaded into said threaded throughbore of said floating nut, said floating nut having a nose portion deformed inwardly toward the central longitudinal axis is of said floating nut engaging said threaded member locking the same to said floating nut.

19. A bolt, nut and washer assembly comprising:
a bolt having an enlarged head at one end and a threaded shank portion at the other end;
a nut having a throughbore with an enlarged heat at one end and a threaded portion at the other end, said nut having a plurality of spaced serrations along the exterior of said shank portion between said head and said nut threaded portion, said bolt being received in said nut with its threaded shank portion threaded to said nut threaded portion; and
a flat washer encircling the shank portion of said nut having an enlarged flat annular non-deformable preformed ring thereon and a thin-walled skirt portion extending away from said ring and integral therewith toward said threaded portion of said nut, said skirt portion being of a deformable material, said washer being of an outer diameter substantially greater than the outer diameter of said enlarged head of said bolt.

20. In the assembly of claim 19 wherein the thickness of said skirt portion tapers downwardly and inwardly toward the central axis of said washer and away from said ring.

21. In the assembly of claim 19 wherein said washer is of a material softer than the material of said shank portion.

22. In the assembly of claim 21 wherein said washer is of 304 stainless steel and said shank portion is of A286 stainless steel.

23. In the assembly of claim 19 wherein said enlarged head is elliptically shaped.

24. In the assembly of claim 19 wherein said nut terminates in a nose portion deformed inwardly toward the central longitudinal axis thereof.

25. In the assembly of claim 19 wherein said nut terminates in a nose portion having an apertured resilient insert mounted therein.

26. In the assembly of claim 19 wherein said threaded portion comprises said shank portion having main body portion and a threaded nut loosely mounted in said main body portion.

27. In the assembly of claim 26 including floating nut anti-rotating means associated with said floating nut and said main body portion for preventing rotation of said floating nut with respect to said main body portion.

28. In the assembly of claim 27 wherein said floating nut anti-rotating means includes said main body portion terminating in a nose having an apertured annular ring therein, the terminal end of said main body portion being thin-walled and swaged against said last-mentioned annular ring retaining said last-mentioned annular ring at the nose of said main body portion, a pair of spaced slots on diametrically opposite sides of said main body portion on the interior thereof between said last-mentioned annular ring and said enlarged head, said nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

29. In the assembly of claim 28 wherein said floating nut terminates in a nose portion deformed inwardly toward the central longitudinal axis of said floating nut.

30. In the assembly of claim 28 wherein said floating nut terminates in a nose portion having an apertured resilient insert mounted therein.

31. A fastener assembly for securing a nut in an opening in a panel comprising:
a nut having an enlarged heat at one end disposed in said opening on one side of said panel, said nut having a shank portion extending through said opening to the other side of said panel, said nut having a threaded portion on said shank portion for threadably securing said nut to a mating threaded member, said nut having locking means disposed about the outer surface of said shank portion on the other side of said panel; and
deformable locking means adapted to mate with said first mentioned locking means surrounding said shank portion and engaging said first mentioned locking means in a locking relationship retaining said nut firmly within said opening, the threaded portion of said nut including said shank portion having a main body portion and a floating nut loosely disposed in said main body portion having threads on the interior thereof, and floating nut anti-rotating means associated with said floating nut and said main body portion, said floating nut anti-rotating means including said main body portion terminating in a nose having an apertured annular ring therein, the terminal end of said main body portion being thin-walled and swaged against said ring retaining said ring at the nose of said shank portion, a pair of spaced slots on diametrically opposite sides of said main body portion on the interior thereof between said ring and said enlarged head, said nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

32. In the assembly of claim 31 including a mating threaded member threaded into said threaded throughbore of said floating nut wherein a resilient insert is mounted in said throughbore engaging said mating threaded member locking the same to said floating nut.

33. In the assembly of claim 32 including a mating threaded member threaded into said threaded throughbore of said floating nut, said floating nut having a nose portion deformed inwardly toward the central longitudinal axis is of said floating nut engaging said threaded member locking the same to said floating nut.

34. A nut and washer assembly comprising:
a nut having a throughbore with an enlarged head at one end and a threaded portion at the other end, said nut having a plurality of spaced serrations along the exterior of said shank portion between said head and said threaded portion; and
a washer encircling the shank portion of said nut having an enlarged annular ring thereon and a thin-walled skirt portion extending away from said ring toward said threaded portion, said skirt portion being of a deformable material, the thickness of said skirt portion tapering downwardly and inwardly toward the central axis of said washer and away from said ring, said threaded portion comprising said shank portion having main body portion and a threaded nut loosely mounted in said main body portion, and floating nut anti-rotating means associated with said floating nut and said main body portion for preventing rotation of said floating nut with respect to said main body portion, said floating nut anti-rotating means including said main body portion terminating in a nose having an aperture annular ring therein, the terminal end of said main body portion being thin-walled and swaged against said last-mentioned annular ring retaining said last-mentioned annular ring at the nose of said main body portion, a pair of spaced slots on diametrically opposite sides of said main body portion on the interior thereof between said last-mentioned annular ring and said enlarged head, said nut having a generally cylindrical main body portion with a threaded throughbore and a pair of diametrically opposite spaced ears extending outwardly from opposite sides thereof, said ears extending into said slots and being loosely disposed in said slots, the overall thickness of said areas being substantially less than the height of said slots.

35. In the assembly of claim 34 wherein said floating nut terminates in a nose portion deformed inwardly toward the central longitudinal axis of said floating nut.

36. In the assembly of claim 34 wherein said floating nut terminates in a nose portion having an apertured resilient insert mounted therein.

* * * * *

UNITED STATES PATENT AND TRADEMARK OFFICE
CERTIFICATE OF CORRECTION

PATENT NO. : 5,037,259
DATED : August 6, 1991
INVENTOR(S) : John A. Duran, Gordon Bussard and Peter Chang It is certified that error appears in the above-identified patent and that said Letters Patent is hereby corrected as shown below:

Column 5, delete lines 9-11.

Signed and Sealed this

Eighth Day of December, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,037,259

DATED : August 6, 1991

INVENTOR(S) : John A. Duran, Gordon Bussard and Peter Chang

It is certified that error appears in the above-identified patent and that said Letters Patent is hereby corrected as shown below:

Column 5, line 57, after claim, insert --1--.

Column 5, line 64, after claim, insert --1--.

Signed and Sealed this

Twenty-fifth Day of May, 1993

Attest:

MICHAEL K. KIRK

*Attesting Officer*     *Acting Commissioner of Patents and Trademarks*